UNITED STATES PATENT OFFICE.

HUGO MOCK, OF NEW YORK, N. Y.

FOOD PRODUCT.

1,414,576. Specification of Letters Patent. Patented May 2, 1922.

No Drawing. Application filed December 21, 1920. Serial No. 432,319.

*To all whom it may concern:*

Be it known that I, HUGO MOCK, a citizen of the United States, residing at 930 St. Nicholas Avenue, New York, in the county of New York and State of New York, have invented certain new and useful Improvements in a Food Product, of which the following is a specification.

This invention relates to a food product obtained from ordinary oats (*Avena sativa*) and has for its object the provision of an oat product which will contain all the valuable nutritive properties of oats in a soluble and readily assimilable form.

It is well known that oats, one of our most valuable cereals contain especially large proportions of proteins, fats and mineral salts but long continued cooking is required to render these in a readily digestible form. Although oatmeal is already one of our most widely used breakfast foods, its use would be greatly increased if the time of the preparation for the table could be shortened. One of the drawbacks to the use of ordinary oatmeal or rolled oats is that this cereal is often undercooked so that the purchaser does not obtain the full nutritive value of the product.

Another objection to oatmeal as commonly sold which this invention tends to obviate, is the fact that ordinary dry oatmeal tends to become mouldy or musty if kept too long a time owing to its high fat and albuminoid content.

My improved food product is produced in the following manner:—

Three parts (by volume) of boiling water are added to one part of dry oatmeal or rolled oats, that is oats from which the hulls have been removed. If cooked on a water bath, this mixture should be cooked for four to six hours but not less than four hours, but if cooked by steam under pressure less time will suffice. The long continued cooking not only tends to dissolve more of the protein and fats in the oatmeal but also renders the starchy material into a more digestible form.

After the boiling is completed, the liquid is separated from the solid residue remaining by means of a filter press, it not being feasible to filter this material without pressure. The solid residue remaining can be employed as a cattle or poultry food.

The filtrate containing the valuable food constituents of the oatmeal is concentrated by heating and when the liquid tends to thicken, further concentration should be done in a vacuum, where the final evaporation of the solution to dryness is effected. Owing to the sensitiveness of the albuminoid and fats present in the solution, the final reduction of the solution to dryness should be effected in a vacuum of not less than twenty inches.

When completely dry, the agglomerated product is ground out of contact with air and in powdered condition is put into sterilized and sealed containers. Care should be taken that no moisture is permitted access to the solid product as this impairs its keeping qualities.

It is also evident that during the process of manufacture, a small percentage of sugar or salt or both may be added to the product either before or after the final concentration.

The dry product has approximately the following compositions:—

Proteins or albuminoids 24%
Fats 4%
Total carbohydrates 65%
Mineral salts 2%

It is readily soluble in hot water and miscible therewith, so an excellent breakfast food can be instantaneously prepared with the use of hot water only and the addition of salt, sugar and milk or cream to flavor as desired.

In more dilute form the product makes an excellent beverage for infants, invalids and all persons desiring to avail themselves of the tonic properties of oats in their readily soluble form.

It is understood that the use of the word soluble herein as applied to a starch or carbohydrate product means that a product is obtained which when treated with hot water leaves no solid or non-filterable residue. The product is not soluble in the sense that sugar or salt is soluble as the solution obtained is somewhat viscous or colloidal in character.

What I claim is:—

1. A dry moisture-free water-soluble extract of oats.

2. A stable dry water-soluble extract of oats in solid form.

3. A dry water soluble extract of oats containing proteins over 20%, fats about 4%, mineral salts about 2%, and total carbohydrates about 65%.

4. A dry water soluble extract of oats containing total carbohydrates more than 60%.

5. A process of producing an extract of oats by boiling oats for four hours with water, freeing the solution from the solid residue and concentrating said residue in a vacuum.

6. A process of producing an extract of oats by boiling oats for four hours with water, freeing the solution from the solid residue and concentrating said residue in a vacuum, and grinding and powdering said residue.

7. A process of producing an extract of oats by boiling the oats for four hours at 212° F., filtering the said solution obtained from the solid residue, concentrating the said residue in a vacuum of not less than twenty inches and grinding and powdering said residue.

8. A process of producing an extract of oats by boiling the oats for four hours at 212° F., filtering the said solution obtained from the solid residue, concentrating the said residue in a vacuum of not less than twenty inches and grinding and powdering said residue, and sealing said extract in containers without contact with air.

In testimony whereof I hereunto affix my signature.

HUGO MOCK.